March 30, 1965   M. A. BROWN ETAL   3,175,277
METHOD OF MAKING STATORS
Filed Feb. 16, 1961   3 Sheets-Sheet 1

INVENTORS
Marvin A. Brown
James P. Dries
BY
McCanna, Morsbach & Pillote
ATTORNEYS March 30, 1965 M. A. BROWN ETAL 3,175,277
METHOD OF MAKING STATORS
Filed Feb. 16, 1961 3 Sheets-Sheet 2
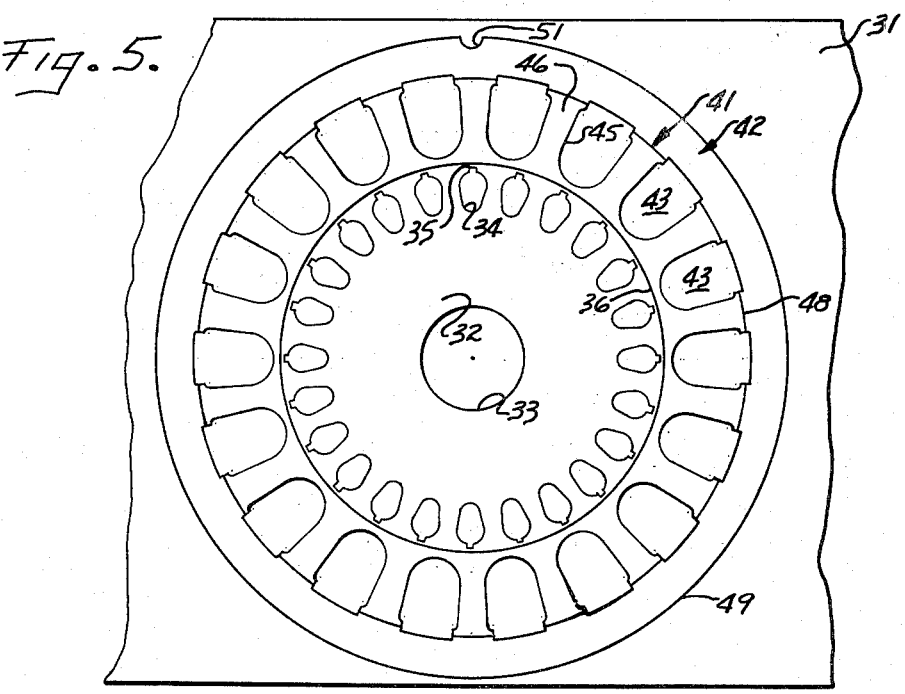
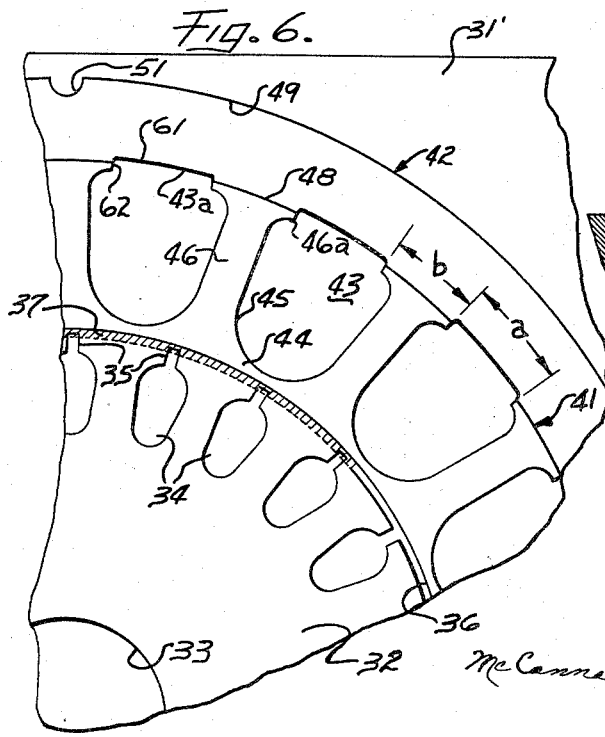
INVENTORS
Marvin A. Brown
James P. Dries
BY
McCanna, Morsbach & Pillote
ATTORNEYS March 30, 1965   M. A. BROWN ETAL   3,175,277
METHOD OF MAKING STATORS
Filed Feb. 16, 1961   3 Sheets-Sheet 3
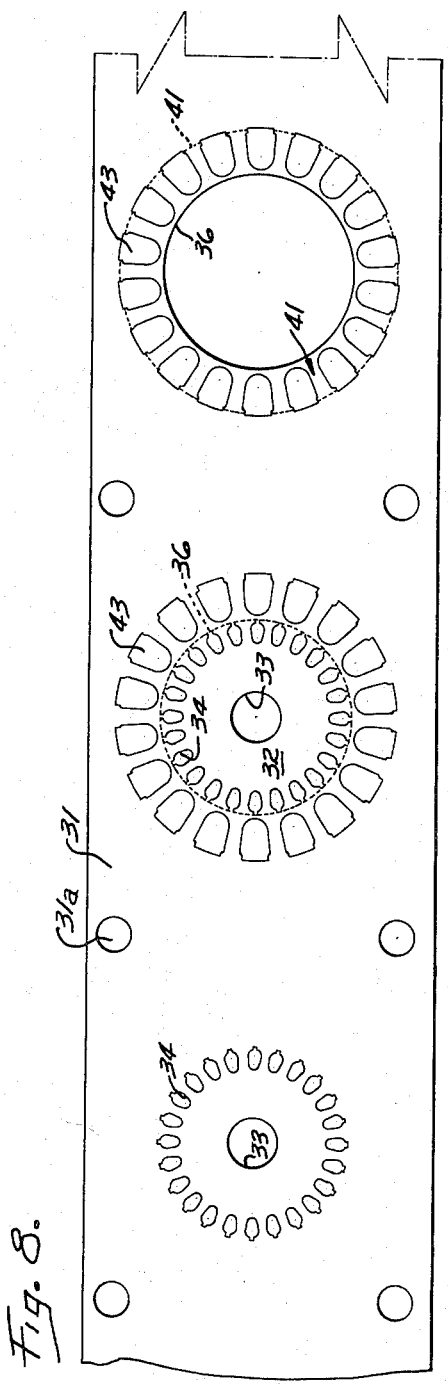
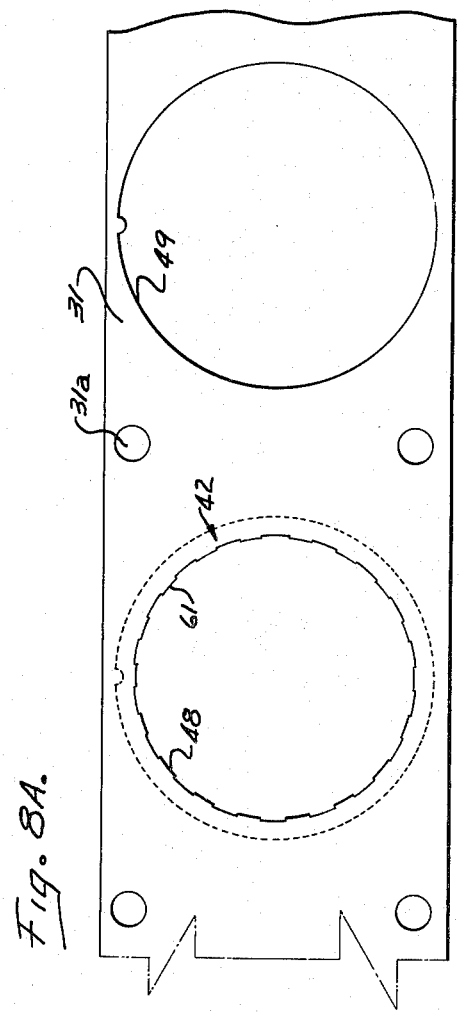
INVENTORS
Marvin A. Brown
James P. Dries
BY
McCanna, Morsbach & Pillote
ATTORNEYS

United States Patent Office 3,175,277
Patented Mar. 30, 1965

3,175,277
METHOD OF MAKING STATORS
Marvin A. Brown, Davenport, Iowa, and James P. Dries, Brookfield, Wis., assignors to Red Jacket Manufacturing Co., Davenport, Iowa, a corporation of Iowa
Filed Feb. 16, 1961, Ser. No. 89,711
9 Claims. (Cl. 29—155.5)

This invention relates to an improved method of making a stator for a dynamo-electric machine and to an improved stator construction produced thereby.

The present invention is generally adapted for use in the construction of motors and the like. Some difficulty is encountered in winding the stator of a dynamo-electric machine when the stator is of the type wherein the winding slots open inwardly of the stator bore. In order to overcome this difficulty, it has heretofore been proposed to utilize a two-piece stator including an inner spider having outwardly opening winding slots, and an outer yoke which is assembled onto the spider after the windings have been placed in the slots. As an economy measure, the laminations for the inner spider and outer yoke are frequently stamped from concentric portions of the same sheet of magnetic material. However, when an article is stamped from a sheet, there is a distortion produced by the stamping such that the piece stamped out is slightly larger than the opening produced by the stamping operation so that the piece cannot be readily re-inserted into the opening. This distortion also occurs when stamping the spider from the outer yoke and reassembling the spiders into the yoke has heretofore presented a considerable problem.

If the oversize spider is pressed back into the yoke, tips of the teeth on the spider laminations rub across the inner walls of the yoke laminations with a cutting and scoring action and produce an undesirable "smearing" of the interengaging surfaces. This smearing adversely affects the magnetic flux paths in the motor. In addition, the very tight radial fit between the spider and yoke produces relatively high radial stresses which frequently cause partial interleaving and interlaminar slipping and shifting of the spider and yoke laminations. Thus, a yoke lamination may abut the periphery of a spider lamination at one point and, because of the high radial pressure between the spider and yoke, the yoke lamination may slip between adjacent spider laminations at another point. This distorts the magnetic flux paths and produces radial shifting of the spider laminations. Since the electrical windings in the slots in the spider laminations are separated from the laminations only by a relatively thin cell slot insulation, the shifting of the laminations tends to puncture the cell slot insulation and may cause shorting of the stator windings. Heating of the outer yoke and shrink-fitting of the yoke onto the spider eliminates the smearing produced by press-fitting, but does not overcome the problem presented by the radial stresses between the spider and yoke, and which radial stresses tend to cause partial interweaving and interlaminar slipping and shifting of the spider and yoke laminations. On the other hand, removal of the material on the outside of the spider or on the inside of the yoke, by grinding, broaching or the like, sufficient to remove the overlap produced by the punching operation does not entirely solve the problems.

The grinding produces some smearing of the laminations. In addition, it increases the cost of manufacture by introducing an additional and relatively expensive step and, moreover, adds some further problems due to the presence of the abraded material in the stator and in the finished motor.

An important object of this invention is to provide an improved method of producing a stator in which concentric spider and yoke annuli are stamped from a piece of magnetic material, and which overcomes the aforementioned problems encountered in reassembling the yoke and spider.

A further object of this invention is to provide a method of stamping concentric spider and yoke annuli from a sheet of magnetic material in such a manner as to enable slip-fit reinsertion of the spider into the yoke without requiring any grinding or other machining operations on either the spider or yoke annuli.

A more particular object of this invention is to provide a method of stamping inner spider annuli and outer yoke annuli from a single sheet of magnetic material where the outer yoke annuli are formed with circumferentially spaced tooth-receiving recesses which are angularly spaced from the portions contiguous to the teeth on the inner spider and which recesses are shaped and dimensioned to receive the teeth on the inner spider with a slip-fit when the spider is punched out of the yoke and turned relative to the yoke a distance equal to one-half the spacing between the centers of adjacent spider teeth.

The stator produced by the present invention is characterized by the annularly spaced recesses in the inner periphery of the yoke which are separated by ribs and which are spaced radially outwardly of the ribs a distance substantially equal to the overlap produced when the spider teeth are stamped from the ribs, and with the recesses having an angular width slightly greater than the width of the teeth on the spider to provide substanially line-to-line contact between the tips of the teeth on the spider and the base of the recesses of the yoke when the spider and yoke are assembled.

These, together with various ancillary objects and features of the present invention will be more readily appreciated as the same becomes better understood by reference to the following detailed description when taken in connection with the accompanying drawings wherein:

FIG. 5 is a diagrammatic view illustrating the several cuts in stamping the rotor, and the inner and outer stator annuli from the magnetic sheet stock;

FIG. 6 is a fragmentary diagrammatic view similar to FIG. 5 and illustrating the parts on an enlarged scale;

FIG. 7 is a diagrammatic view illustrating the punching of the spider annuli from the yoke annuli; and FIGS. 8 and 8a are a layout of a progressive die blank illustrating the successive blanking operations for producing the rotor, and the inner and outer stator annuli.

Figure 1:
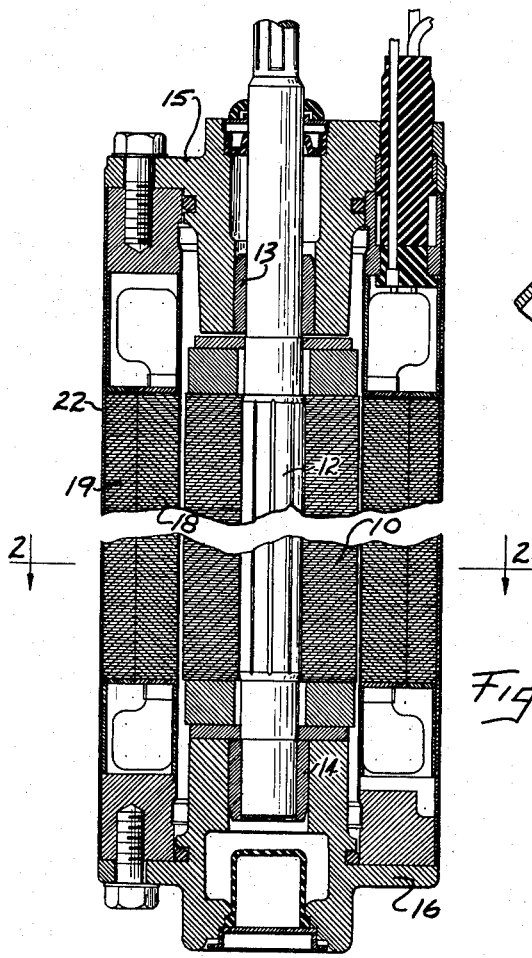
FIG. 1 is a longitudinal sectional view through a motor embodying the present invention.
Figure 4:
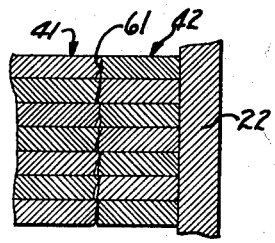
FIG. 4 is a fragmentary sectional view through the spider and yoke taken on the plane 4—4 of FIG. 3.

Reference is now made more specifically to FIG. 1 of the drawings wherein there is illustrated a motor constructed in accordance with the present invention. The particular motor illustrated is of the submersible type such as are frequently used in well casings, pipe lines, and the like. It is to be understood, however, that the present invention is not limited to use in constructing submersible motors, and that it is generally adapted for use in the construction of dynamo-electric machines. In those stator constructions having winding slots which open internally of the stator bore, considerable difficulty is encountered in inserting the windings through the long internal slots in the stator. To overcome this difficulty, the stator of the present invention is formed of two pieces including a spider having outwardly opening winding slots and a yoke which is mounted on the spider after the windings have been placed in the slots.

The motor includes a laminated rotor 10 having a shaft 12 which is rotatably supported in bearings 13 and 14. As is conventional, the bearings are carried by end bells 15 and 16 attached to the motor casing 22. The stator 17 which surrounds the motor is of the two-piece type and which includes an inner spider 18 having outwardly opening winding slots therein, and an outer yoke 19 which surrounds the spider. With this construction, the winding slots in the spider are readily accessible at the outer periphery of the spider so that the electrical windings can be readily placed in the slots, and the outer yoke is assembled onto the spider after the spider is wound.

Figure 3:
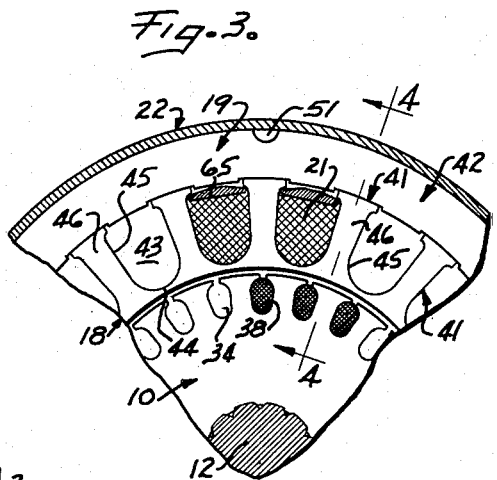
FIG. 3 is a fragmentary transverse sectional view through the motor on an enlarged scale and illustrating the spider laminations assembled into the yoke.

In order to conserve material, the laminations for the rotor, spider and yoke are preferably stamped in concentric sets from the sheet 31 of magnetic material. As shown in FIGS. 5 and 6, the rotor laminations 32 are stamped or punched from a central portion of the sheet of magnetic material 31. The laminations are formed with a central shaft opening 33 and a plurality of annularly spaced openings 34 which receive the rotor conductors 38 (see FIG. 3). In an induction type motor, these rotor conductors are in the form of bars which are inserted or cast into the rotor openings. The rotor openings 34 may be of the closed-slot type in which the conductors are inserted or cast from the end stacked rotor or, alternatively, the openings may be formed with a generally spade shape and have outward extensions or keyways 35 which are arranged to extend to the outer periphery of the completed rotor to enable radial insertion of the rotor conductors. As shown, the keyways 35 extend to a point adjacent the severance line 36 along which the rotor laminations are punched from the spider annuli. The peripheral portion 37 (see FIG. 6) of the rotor laminations is removed to provide a running clearance with the stator bore and this may be effected in any desired manner, as by a trim stage in the punching or stamping of the rotor laminations, or by cutting or grinding off the outer periphery of the rotor laminations after they have been assembled in a stack.

The spider and yoke annuli 41 and 42 are formed from radially contiguous portions of the sheet of magnetic material surrounding the rotor lamination 32. A plurality of openings 43 are punched or blanked from the stock which eventually forms the spider annuli, and which openings are spaced radially outwardly a short distance from the severance line 36 to provide a thin, continuous ring portion 44 at the inner periphery of the spider annuli. It is preferable to maintain the radial thickness of the ring portion at the point medially between adjacent spider teeth at a minimum consistent with good stamping practice and to provide adequate mechanical strength in the spider for handling of the laminations during stacking and winding. In general, the ring thickness should be approximately equal to the thickness of the lamination stock. Thus, for a small diameter stator having a rotor bore of about 2 inches, and using 24-gauge stock the ring thickness is about .025 inch. The openings 43 define winding receiving notches or slots 45 which are separated by teeth 46 that connect the spider annuli to the yoke annuli. The spider annuli are separated from the yoke annuli by stamping along the severance line 48 and the yoke annuli are thereafter separated from the sheet 31 by stamping along a severance line 49. One or more notches 51 are advantageously formed in the outer periphery of the yoke annuli to facilitate alignment of the yoke annuli, for reasons set forth hereinafter.

When a piece is stamped or punched out of another piece, there is a certain amount of distortion or radial overlap between the punched out member and the sheet from which it is punched, such that the punched out piece cannot be readily reinserted into the opening formed during the punching operation. It is considered that the reason for this radial distortion or overlap will be best appreciated from a consideration of FIG. 7 wherein there is diagrammatically illustrated the cutting portions of a die 52 and a punch 54 which are used in severing the spider annuli from the yoke annuli. In this drawing, the radial distortion or overlap and the clearance between the punch 54 and the walls of the die opening 53 are exaggerated somewhat for purposes of illustration. The die opening 53 corresponds to the shape of the punch 54 but is slightly larger to provide a working clearance therebetween. The amount of this clearance is determined primarily by the thickness and type of material being punched. The necessary die clearance is generally about 5% to 6% of the thickness of the stock being punched and, for motor lamination stock having a thickness of about .026 inch to .029 inch, the clearance for good stamping practice should be about .001 inch to .002 inch. As the punch 54 passes through the sheet stock 31 and presses the blank such as the spider annuli 41 from the yoke annuli 42, the punched piece 41 will separate from the remainder of the sheet along an irregular shear line such as is shown at 56. As will be noted, the configuration of the shear line is determined in part by the clearance between the punch and die so that the overshear increases as the clearance is increased. In addition, the punched out piece 41 and the surrounding sheet 42 are in effect "torn" apart by the punching operation and this produces a radial distortion such that the spider and yoke tend to expand respectively outwardly and inwardly after the spider passes out of the die and the punch is withdrawn from the yoke. There are further variations in the roundness of the outer diameter of the spider and the inner diameter of the yoke, hereinafter referred to as eccentricity of the spider and yoke, due to such factors as stresses in the sheet stock incurred during forming of the sheet material and stresses incurred during the stamping operations. This eccentricity, even following good stamping practices, may amount to plus or minus .002 inch. The result is that there is a substantial radial distortion or overlap between the piece which is punched out and the surrounding portion of the sheet stock which prevents ready reinsertion of the punched out piece into the opening. The amount of the distortion varies dependent on a number of factors such as the clearance between the punch and die opening, the thickness and type or hardness of stock being punched and the eccentricity of the spider and yoke. In stamping laminations, the amount of the diametral overlap, that is the difference between the outside diameter of the spider and inner diameter of the yoke (twice the radial overlap) can be as low as .002 inch with some lamination materials under the most favorable conditions such as very small punch and die clearance etc., and can be as high as .007 inch with some lamination materials even following good stamping practices as regards punch and die clearance.

This radial overlap which occurs when the spider laminations are punched or stamped from the yoke laminations, inhibits reinsertion of the stacked spider annuli into the stacked yoke annuli. In accordance with the present invention, the spider and yoke annuli are stamped from each other in such a manner as to enable ready reassembly of the spider into the yoke, without requiring either a press or shrink fit between the spider and yoke, and without necessitating removal of the overlap material by grinding or otherwise.

As best shown in FIG. 6, the openings 43 have a generally spade shape with outwardly projecting neck portions 43a at the radially outer ends thereof. The neck portions are advantageously formed with an arcuate outer end wall 61 which is concentric with the axis of the spider and generally transversely extending edge walls 62 which extend in a generally radial direction. The angular width of the outer wall 61, designated a in FIG. 6 is made less than the angular width designated b of the space between the adjacent neck portions 43a, so that the width of the outer ends of the teeth 46 is less than the spacing between adjacent teeth. The severance line 48 which separates the spider laminations from the yoke laminations is positioned so as to intersect the neck portions 43a of the openings 43 intermediate the ends of the side edges 62 and is spaced inwardly from the outer edge 61 of the openings a distance sufficient to accommodate the radial overlap produced along the severance line 48 when the spider laminations are punched or stamped from the yoke laminations. As is shown in the drawings, the severance line 48 which extends across the teeth 46 is formed complementary to the outer edge 61 of the openings and is also concentric with the spider annuli. When the spider is separated from the yoke in this manner, the inner periphery of the spider will have alternate recesses and ribs, with the recesses having an angular width somewhat greater than the ribs, and with the inner diameter of the yoke measured across the recesses therein substantially equal to the outer diameter of the spider measured across the tips of the spider teeth. Preferably, the spider diameter across the teeth and the yoke diameter across the recesses are selected to provide a line-to-line or even a slight clearance fit therebetween, as contrasted to a slight press fit, in order to prevent "smearing" of the laminations. If the severance line 48 is properly concentric with the line defined by the outer edges 61 of the openings, the recesses will have a radial depth substantially equal to the radial overlap between the spider teeth and the ribs on the yoke. Consequently, the spider teeth can be readily inserted into the yoke by indexing the spider relative to the yoke a distance equal to one-half the spacing between the centers of adjacent teeth so that the teeth on the spider align with the recesses in the yoke to provide a slip-fit therebetween.

When the openings 43 are punched from the sheet stock there is a radial distortion along the outer edge 61 of the openings 43 similar to the radial distortion on the inner periphery of the yoke along the severance line 48. When all factors such as punch and die clearance are equal, the openings 61 will have a diameter less than the outer diameter of the punch which forms the openings 43 by an amount substantially the same as the difference in the diameter of the yoke along severance line 48 and the outer diameter of the punch which forms this severance line. Therefore, the diameter of the punch for separating the spider annuli from the yoke annuli along the severance line 48 should be less than the outer diameter of the punch which forms the outer edges 61 of the openings 43 by an amount substantially equal to the diametral overlap along the severance line 48. As previously noted, this overlap will vary for different punch and die clearances and different materials in the range of about .002 inch–.007 inch. In the usual motor lamination stock having a thickness of about .025 inch–.029 inch, and following good stamping practices as regards minimum punch and die clearance, this diametral overlap will be about .004 inch (.002 inch radial overlap). Thus, the depth of the recesses in the yoke will be about one-half the diametral overlap and will vary in the range .001–.0035 inch. In order to avoid sharp edges on the lateral tongues 46a at the outer ends of the teeth 46, the length of the generally radial edges 62 of the openings is made substantially greater than the radial spacing between the severance line 48 and the edge 61 of the opening. For example, the radial depth of the outer extensions 43a of the openings 43 may be about .020 inch to avoid undercutting the tongues 46a due to slight changes in centers or diameters during punching of the openings 43 and the severance line 48.

The several openings may be formed, and the different annuli separated from each other and from the sheet in a progressive die. As shown in FIG. 8, the sheet 31 is formed with locating openings 31a to facilitate positioning of the sheet at the successive punching stations. The shaft opening 33 and the rotor openings 34 may conveniently be blanked out at a first station. The generally spade shape spider openings 43 are blanked out at a second station and the rotor lamination then separated from the sheet along the severance line 36 at a third station. The spider laminations 41 are blanked and separated from the yoke laminations 42 along the severance line 48 at a third station and the yoke annuli 42 are severed from the sheet 31 along a severance line 49 at a fifth station.

Figure 2:
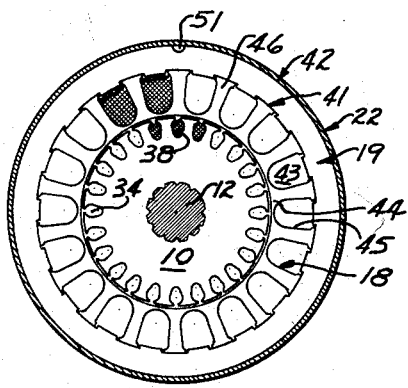
FIG. 2 is a transverse sectional view taken on the plane 2—2 of FIG. 1.

After the several annuli have been blanked from the sheet of magnetic material, the yoke annuli are stacked with the notches or slots 45 in alignment to provide winding receiving slots and the electrical windings 21 (FIGS. 1–3) are placed in the slots and held in position therein by means of wedges 65. The yoke annuli are also stacked in assembled relation with the recesses therein axially aligned. This is conveniently achieved by aligning the notches 51 in the outer periphery of the yoke annuli. The spider and yoke are thereafter telescopically assembled with a slip-fit by inserting the teeth 46 on the spider into the recesses in the inner periphery of the yoke. Since the recesses are undercut a distance substantially equal to the radial distortion or overlap between the teeth and the yoke, along the severance line 48 therebetween, the teeth on the spider are slidably receivable in the recesses and the spider and yoke laminations have substantially line-to-line contact therebetween. By reason of the slip-fit between the teeth on the spider and the recesses in the yoke, there is no significant "smearing" of the spider and yoke laminations at the interengaging faces such as would adversely affect the magnetic flux paths between the spider and yoke. In addition, there is a large radial pressure between the spider and yoke and which would tend to cause partial interleaving or inter-laminar slipping or shifting of the spider and yoke laminations. Moreover, the reassembly of the spider and yoke is effected without requiring any grinding or other machining operations on the interengaging faces of the interengaging faces of the spider and yoke and, when assembled the recesses effectively prevent angular turning of the spider and yoke. It will further be noted that the severance line 41 between the spider and yoke intersects the openings 43 at substantially right angles thereof so that a slight shift in centers during punching of the openings 43 and stamping along the severance line 48 will not produce either overcutting of the edge 61 of the openings or undercutting of the tongues 46a on the spider teeth. As will be noted a slight shift in centers during punching of the openings 43 and punching of the severance line 48 may cause the recesses in the inner surface of the yoke to be slightly deeper at one side of the yoke than at the other. However, the relative outer diameter of the spider and the inner diameter of the yoke at the recesses will not be changed due to such a shift in centers and the spider can still be reinserted into the yoke with a slip-fit to provide a substantially line-to-line-fit between the spider and yoke laminations.

We claim:
1. The method of making a stator having stacked inner annuli with outwardly projecting teeth defining winding slots and stacked outer annuli extending around the teeth on the inner annuli comprising, blanking out sets of inner and outer annuli from a sheet of magnetic material with the ends of the teeth on each inner annulus extending contiguous to annularly spaced portions on a respective outer annulus and with recesses in the outer annulus between the annularly spaced portions thereon, the blanking out of each inner annulus from the outer annulus producing a radial overlap between the ends of the teeth on the inner annulus and the annularly spaced portions on the outer annulus, the recesses having an angular width greater than the ends of the teeth and spaced radially outwardly from adjacent annularly spaced portions a small distance substantially equal to the radial overlap produced by the blanking operation between the teeth on the inner annulus and the annularly spaced portions on the outer annulus, stacking the inner annuli with the teeth in alignment to provide winding slots therebetween, placing electrical windings in the slots, stacking the outer annuli with the recesses in alignment, and assembling the inner stacked annuli into the outer stacked annuli with the teeth on the inner annuli extending into the recesses in the outer annuli to provide a substantially line-to-line fit therebetween.

2. The method of making a stator having stacked inner annuli with outwardly projecting teeth and stacked outer annuli extending around the teeth on the inner annuli comprising, blanking a plurality of annularly spaced openings in that portion of a sheet of magnetic material forming the inner annulus with the radially outer ends of each opening projecting into that portion of the sheet forming the outer annulus, the outer ends of the openings having a greater angular width than the width of the teeth between the outer ends of the openings, blanking out the inner annulus from the outer annulus along a severance line extending across the teeth and intersecting the openings to provide ribs on the portions of the outer annulus contiguous to the tips of the teeth on the inner annulus and recesses in the outer annulus between the ribs, the blanking out of the inner annulus from the outer annulus producing a radial overlap between the tips of the teeth on the inner annulus and the ribs on the outer annulus, the severance line across the teeth being spaced inwardly from the outer ends of the openings a distance such that the recesses have a radial depth relative to the ribs substantially equal to the radial overlap produced by the blanking operation along the severance line between teeth and the ribs, blanking out the outer annulus from the sheet of material, stacking the inner annuli with the teeth aligned to provide winding slots therebetween, placing electrical windings in the slots, stacking the outer annuli with the recesses in alignment, and assembling the inner stacked annuli into the outer stacked annuli with the teeth on the inner annuli extending into the recesses in the outer annuli to provide substantially line-to-line contact therebetween.

3. The combination of claim 2 wherein the radial depth of the recesses in the outer annuli is in the range .001–.0035".

4. The combination of claim 2 wherein the radial depth of the recesses in the outer annuli is about .002".

5. The method of making a stator having stacked inner annuli with outwardly projecting teeth and stacked outer annuli extending around the teeth on the inner annuli comprising, punching a plurality of annularly spaced openings in a thin sheet of magnetic material to provide annularly spaced teeth connecting the inner and outer annuli, locating and shaping the openings so that the radially outer ends of the openings having an arcuate configuration concentric with the axis of the inner and outer annuli and having an angular width slightly greater than the width of the teeth between the arcuate outer ends of the openings, blanking out the inner annulus from the outer annulus along a severance line substantially concentric with the axis thereof and extending across the teeth with male and female blanking dies that produce a radial overlap along the severance line across the teeth, locating the severance line to intersect said openings at a point radially inwardly of said outer edge a distance substantially equal to the radial overlap produced by the blanking operation along the severance line of the teeth to provide outwardly opening notches in the inner annulus and inwardly opening recesses in the outer annulus, blanking out the outer annulus from the sheet of material, stacking the outer annuli with the notches aligned to provide winding slots, placing electrical windings in the slots, stacking the outer annuli with the recesses aligned, and assembling the inner stacked annuli into the outer stacked annuli with the teeth on the inner annuli extending into the recesses in the outer annuli to provide a substantially line-to-line fit therebetween.

6. The method of making a stator for a dynamo-electric machine having stacked inner annuli with outwardly projecting teeth and stacked outer annuli extending around the teeth on the inner annuli comprising, separating radially contiguous inner and outer annuli from a sheet of magnetic material with mating male and female blanking dies to provide a broken inner severance line on the outer annuli having alternate ribs and recesses and to provide a broken outer severance line on the inner annuli having alternate teeth and notches with the teeth extending contiguous to the ribs on the outer annuli and with the notches registering with the recesses, the blanking of the inner annuli from the outer annuli producing a radial overlap between the ribs of the outer annuli and the teeth on the inner annuli, forming said recesses in the outer annuli with a radial depth relative to the ribs substantially equal to the radial overlap produced by the stamping operation between the ribs on the outer annuli and the teeth on the inner annuli, stacking the inner annuli with the notches aligned to provide winding slots, placing electrical windings in the slots, stacking the outer annuli with the recesses aligned, and assembling the inner annuli into the outer annuli with the teeth on the inner annuli projecting into the recesses in the outer annuli to provide a substantially line-to-line fit therebetween.

7. The method of claim 6 wherein the difference between the inner diameter of the outer annulus at the ribs and its inner diameter at the recesses is in the range .002–.007 inch.

8. The method of claim 6 wherein the difference between the inner diameter of the outer annulus at the ribs and its inner diameter at the recesses is about .004 inch.

9. The method of making a stator having stacked inner annuli with outwardly projecting teeth and stacked outer annuli extending around the teeth on the inner annuli comprising, blanking a plurality of generally spade-shaped openings in that portion of a thin sheet of magnetic material forming the inner annulus to provide annularly spaced teeth connecting the inner and outer annuli, locating and shaping the openings with neck portions on the radially outer ends of the openings which extend outwardly into that portion of the material forming the outer annulus and have an angular width greater than the angular spacing between adjacent neck portions, blanking out the inner annulus from the outer annulus along a severance line extending across the teeth with male and female blanking dies that produce a radial overlap along the severance line across the teeth, locating the severance line to intersect said neck portions of the openings at a point spaced radially inwardly of the radially outer edges thereof a distance substantially equal to the radial overlap produced by the blanking operation along said severance line to provide ribs on the inner periphery of the outer annulus between adjacent openings therein whereby the outer annulus has an inner diameter measured across said openings greater than its inner diameter measured across the ribs by an amount substantially equal to the diametral overlap produced by the blanking operation along said severance line, stacking the inner annuli with the openings in alignment, placing electrical windings in the openings, stacking the outer annuli with the recesses in alignment, and assembling the inner annuli into the outer annuli with the teeth on the inner annuli projecting into the recesses in the outer annuli to provide a substantial line-to-line fit therebetween.

References Cited by the Examiner

UNITED STATES PATENTS

| | | | |
|---|---|---|---|
| 1,260,743 | 3/18 | Attila | 29—155.61 X |
| 2,354,551 | 7/44 | Sawyer | 29—155.5 |
| 2,711,008 | 6/55 | Smith | 29—155.57 X |
| 2,871,384 | 1/59 | Gabriel | 310—258 |
| 2,953,699 | 9/60 | Redding | 310—258 |
| 3,002,263 | 10/61 | Feinberg et al. | 29—416 X |

WHITMORE A. WILTZ, *Primary Examiner.*

MILTON HIRSHFIELD, *Examiner.*